United States Patent [19]
Irwin et al.

[11] 3,803,632
[45] Apr. 9, 1974

[54] DATA-ENTRY CLOCK MEANS AND METHOD OF IMPLEMENTING SAME

[75] Inventors: Samuel N. Irwin; John M. Apple; Harshad B. Shah, all of Ann Arbor, Mich.

[73] Assignee: Sycor, Inc., Ann Arbor, Mich.

[22] Filed: Oct. 14, 1971

[21] Appl. No.: 189,376

[52] U.S. Cl. ........................ 346/74 M, 340/174.1 A
[51] Int. Cl. ........................................... G11b 15/02
[58] Field of Search ........... 346/74 M; 340/174.1 A; 226/28, 24; 179/100.2 T

[56] References Cited

UNITED STATES PATENTS

| | | | |
|---|---|---|---|
| 3,332,084 | 7/1967 | Wahrer et al. | 340/174.1 A |
| 3,576,584 | 4/1971 | Cone et al. | 340/174.1 A |

*Primary Examiner*—Terrell W. Fears
*Assistant Examiner*—Jay P. Lucas
*Attorney, Agent, or Firm*—Price, Heneveld, Huizenga & Cooper

[57] ABSTRACT

An optical-mechanical clock for controlling the spacing of data bits recorded on magnetic tape and for controlling the rate at which the tape moves across the recording head. The clock signal is generated by an optical shutter driven by and physically linked to the tape driving source, and positioned between a light source and an optical pick-off. The electrical output of the pick-off is utilized to control either or both the tape speed and the data insertion rate.

8 Claims, 3 Drawing Figures

DATA-ENTRY CLOCK MEANS AND METHOD OF IMPLEMENTING SAME

BACKGROUND OF THE INVENTION

Prior art control systems for digital data recording or like operations in data handling devices generally require a closely-regulated clock signal to control the data bit insertion rate and spacing, and a separate circuit is used to control the speed of the tape drive motor. Probably the most frequently-used such method for controlling the data insertion rate is to pre-record a clock track on the magnetic tape. In operation, this track provides a train of timing or clock pulses which is used to trigger the data input device at a predetermined rate, as for example to insert a desired total number of bits of information per inch of tape travel. In such devices, it is necessary to maintain the speed of the tape in synchronization with the clock pulse generator so that the data bits are recorded in allocated positions and properly spaced. Various other means have been proposed for producing a series of synchronized pulses from the tape or elsewhere relative to the tape travel, which occur at the repetition rate of the timing pulses on the tape. Generally the two sets of pulses are compared and a signal indicative of the relative timing is obtained which is applied as an error-correcting voltage to the tape driving motor to adjust its speed. This, then, is used to maintain the two sets of pulses in a synchronized relationship.

In commonly assigned co-pending applications Ser. No. 795,415 and Ser. No. 806,932 filed Jan. 31 and Mar. 13, 1969 now U.S. Pat. Nos. 3,587,997, issued June 28, 1971 and 3,582,743, issued June 1, 1971, respectively, recorder and control devices for magnetic tapes contained in a cassette are disclosed for use with data processing equipment. Cassette-type tape magazines, because of their size, are limited in the number of tracks of useful data information they can carry. When a clock input track is placed on the tape, one of the tracks is eliminated as far as data handling is concerned. However, in order to utilize the cassette tape to its maximum, it is very desirable to eleminate the need for having a clock track recorded on the tape, since this would allow the use of such track for data handling.

SUMMARY OF THE INVENTION

The present invention relates to a control apparatus and method for controlling the timing of operations in electronic digital data input and storage devices. The invention is particularly applicable for controlling the data bit insertion rate on a magnetic recording medium and also for controlling the linear speed of a magnetic tape used as a medium for recording the digital data. The linear travel speed and the data bit input rate are, in accordance with the invention, synchronized and each uses the same reference.

The invention provides an optical-mechanical clock which produces a signal that is directly related to tape drive capstan rotation and, consequently, to linear tape travel itself. The capstan drive motor is provided with an extended shaft which carries an optical shutter. A light source and a photosensing device are positioned on opposite sides of the shutter to sense the opening and closing of the shutter as it is rotated with the shaft. The shutter is designed to provide a particular number of light pulses from the light source to the sensor during each shaft revolution, and the frequency of shaft revolutions (i.e., motor speed) is carefully controlled so that the frequency of the light pulses equals the desired data insertion rate. Thus, the light pulses become data clocking signals and the shutter arrangement is a data clock. The light pulses provide a control signal which may be used for motor speed control and also to provide the clock input to control the data insertion rate.

DESCRIPTION OF THE PREFERRED EMBODIMENT OF THE INVENTION

Figure 1:
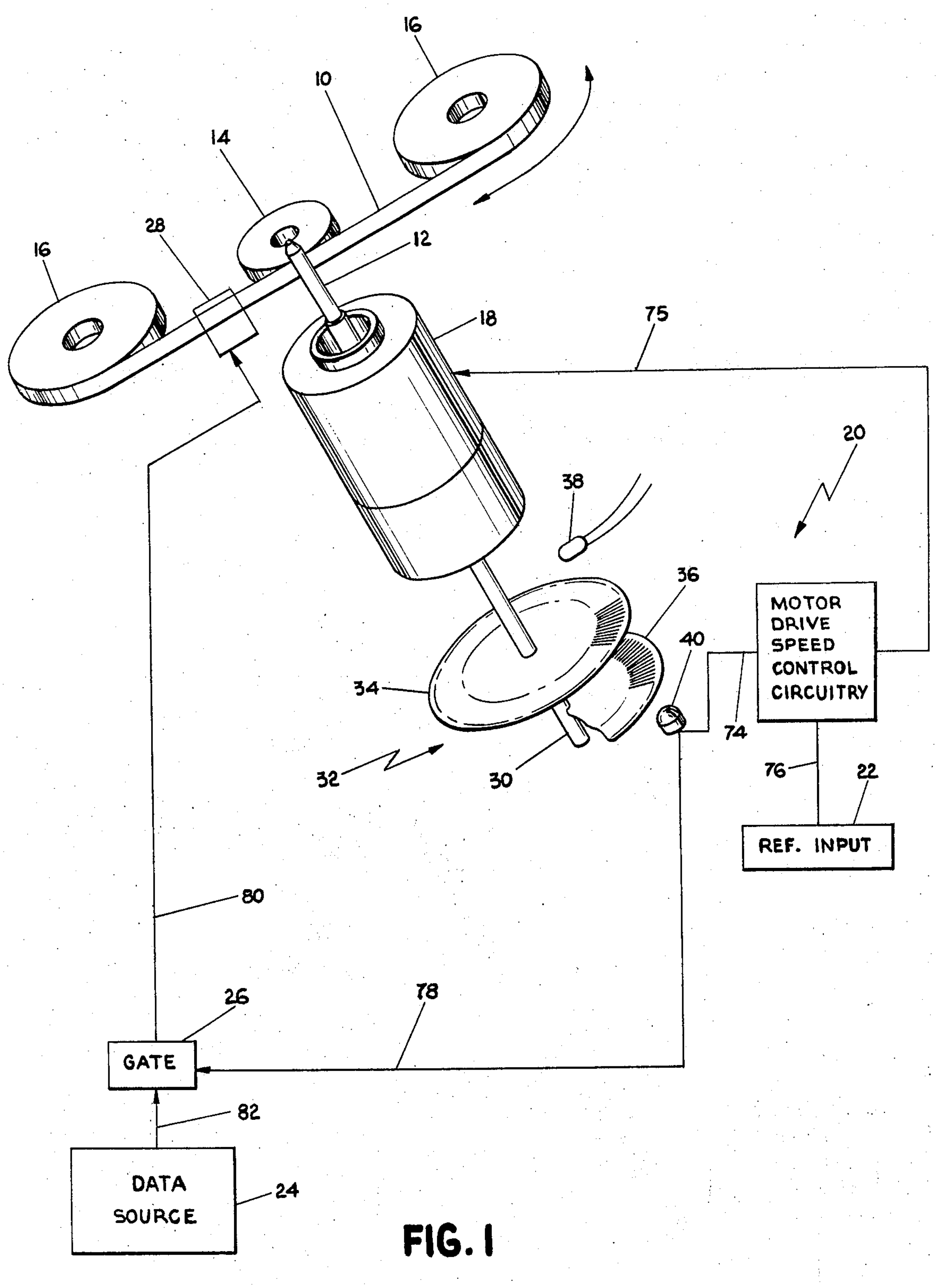
FIG. 1 is a pictorial block diagram of an illustrative embodiment of the invention.

Referring now to the drawings, FIG. 1 illustrates the general nature of the invention, in pictorial block diagram form. A magnetic tape 10 carried on a pair of take-up reels 16, 16 is driven by a capstan 12 having a co-acting pinch wheel 14. Such a tape, tape carriers, and capstan drive are, of course, entirely conventional in their construction, and the tape may be housed in a self-contained cassette magazine unit of the type discussed in the above mentioned co-pending applications. A further description, therefore, is not believed necessary as the construction and operation of the tape within a cassette will be well known to those skilled in the art.

In accordance with the present invention, the capstan 12 is driven by a variable speed direct current motor 18 and is speed controlled through a closed loop servo system 20 which includes error signal-deriving and compensating drive control circuitry, designated generally by the numeral 21. A reference signal from a source 22 is coupled to the drive circuit means 21 just mentioned, by which the closed loop servo system may in a known manner, vary the drive excitation of and thereby carefully control the speed of, the tape drive motor 18.

As mentioned previously, the present invention provides a tape control and data clocking system especially advantageous for utilization with a data input terminal. A data source 24 which may be considered a data input terminal is therefore illustrated in FIG. 1 as being connected through a gate 26 (which is likely to be a part of the data input terminal but which is shown separately for purposes of illustration) to a data input head 28 positioned adjacent the tape 10. The tape head 28 will normally be a "read/write" device, adapted to record or detect magnetic information or data bits on the tape.

The capstan shaft 12 extends through the motor 18 and is adapted at its extended end 30 to carry portions of, and operate, an optical-mechanical clock 32. More particularly, the clock 32 includes an optical disc 34, a mask 36, light source 38 and an optical sensor 40.

Figures 2, 3:
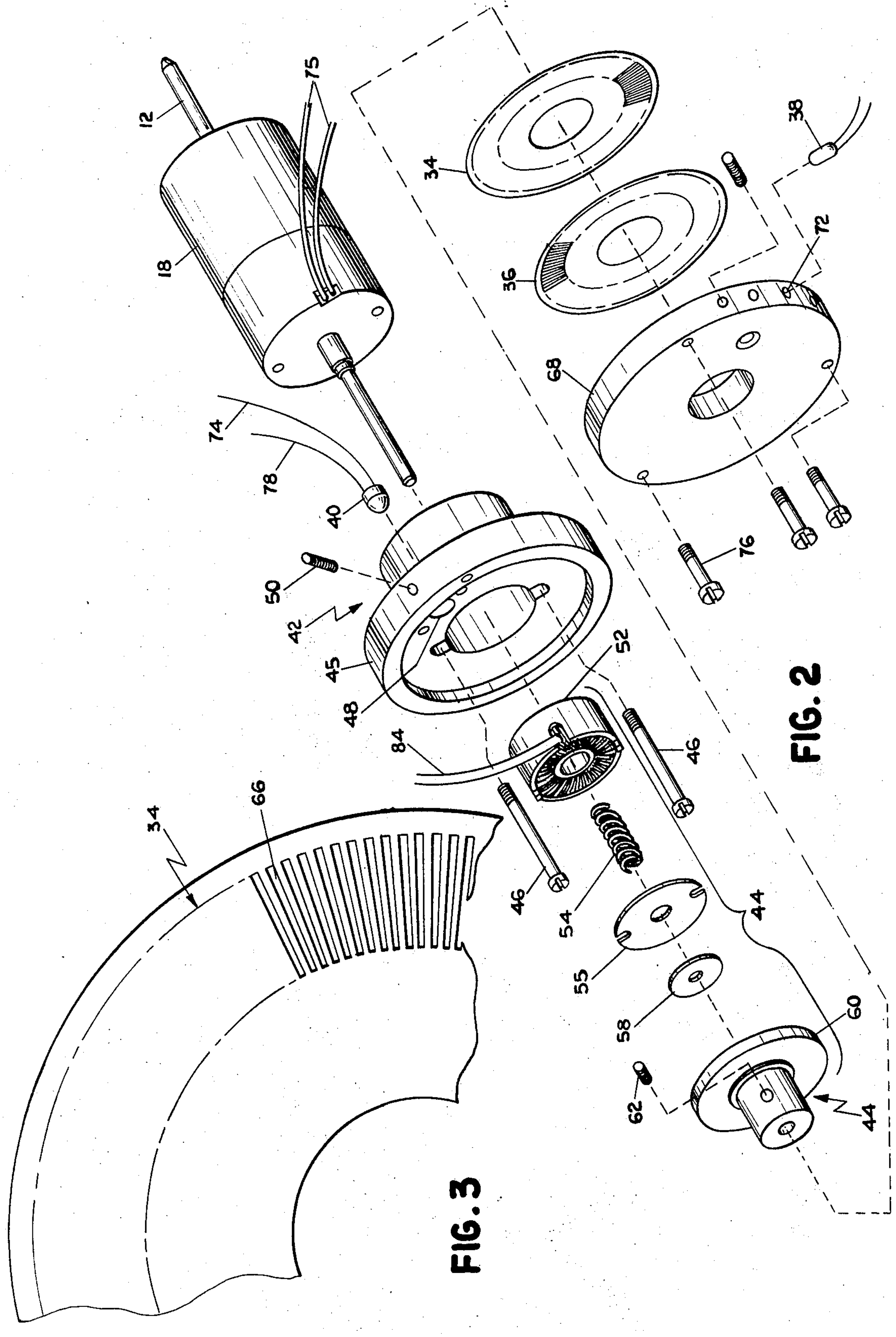
FIG. 2 is an enlarged exploded perspective view of drive and optical mechanisms in accordance with the invention.
FIG. 3 is a further enlarged plan view of the optical disc utilized in accordance with the invention.

Referring now to FIG. 2, the capstan drive motor 18 and the optical clock 32 will be described in detail. The motor 18 is of conventional construction, reversible, and operates from a DC source. For most efficient operation it is desirable to utilize a motor having preloaded bearings and one which will operate at and maintain a basically constant speed.

The optical clock 32 operated by the extended shaft 30 is contained within a housing 42 which also contains a brake mechanism 44 utilized to instantly stop the motor (and consequently the movement of the tape across the data input head). As shown in the exploded view, the upper portion 45 of the housing 42 is adapted to fit on one end of the motor 18, surrounding the extended shaft 30. Fastening means such as screws 46 fix the housing to the motor and hold it securely in place. The housing is provided with an opening 48 to hold the optical sensor 40, which may be any one of the several varieties of commonly available light sensing pick-off devices, for example, a photo-transistor. The sensor is fixed within the opening 48 and held in place by set screw 50.

The brake mechanism 44 mentioned above is positioned within the housing 42 and comprises a coil assembly 52, a coil spring 54, an armature 56, a friction disc 58 and a brake wheel 60 arranged in series along the shaft 30. All of the foregoing elements except the brake wheel 60 are fixed to the housing 42, while the brake wheel is fixed to the shaft 30, by set screws 62, for rotation with the shaft. The winding or coil of assembly 52 has a pair of leads 64 connected through suitable switching means to a power source (not shown). Upon application of current to the leads, the coil 52, acting as an electromagnet, draws the armature and friction disc away from the brake wheel, thereby allowing the shaft to freely rotate. When the power is switched off, the spring 54 urges the friction disc 58 against the brake wheel 60 and the rotation of the shaft is stopped. As is well known to those skilled in the art, starting, stopping and reverse rotation of the tape's travel must be accomplished practically instantaneously, and the foregoing brake means helps to accomplish such a function.

Turning briefly to FIG. 3, a greatly enlarged section of the optical disc 34 is illustrated. As shown in FIG. 1, the disc is circular in shape and may be constructed from 0.005 inch thick beryllium copper with a black oxide finish. Evenly spaced around the disc are a plurality of laterally spaced radial slots 66. In a disc having an outside diameter of approximately 1.850 inches the slots may be approximately 0.250 inch long and 0.005 inch in width. In a typical working example, a total of 296 slots are provided around the disc. Other slot widths and spacings may be provided depending upon the particular application, as will be more fully described hereinafter.

Referring again to FIG. 2, the optical disc 34 is fixed to the brake wheel 60 so that it will rotate directly with the shaft 30. A mask 36, which may be of similar construction to the disc 34, is mounted concentrically with the latter and fixed in position in the lower section 68 of the housing 42. The lower section 68 is fixed to the upper portion of the housing by means of screws 70 thereby completely enclosing the brake mechanism 44 and the optical clock 32 within the housing. A light source 38 is positioned in the lower section of the housing 68 through an opening 72 therein, and is positioned to be in alignment with the sensor 40 so that a beam of light from the source will be projected onto the sensor 40 through the optical disc and mask when the latter are properly positioned.

In a specific embodiment of the invention, an illustrative tape travel speed may be 12.5 inches per second with a data insertion rate of 800 bits per inch of tape. In such an arrangement, the optical clock may be designed to provide 296 signals per shaft revolution; therefore, to allow 800 signals per inch of tape travel, the capstan diameter is 0.188 inch. It may therefore be seen that the data input rate will be on the order of 10,000 bits per second. It may also be seen that various insertion rates (bits/inch) or data rates (bits/second) may be provided by varying the number of signals per shaft revolution and shaft diameter (circumference), and at a fixed insertion rate the data rate will vary directly with shaft R.P.M. (motor speed).

OPERATION

Once the desired data insertion rate and tape travel speeds have been selected, it is then necessary to accurately control and synchronize these two functions. As previously mentioned it has been common in the past to record a clock signal on one track of the tape to control the data insertion and read-out rates, but this practice is completely eliminated by the present invention. Instead, a new source of clock signals is used which is proportional to motor speed, and this is also utilized in a closed-loop servo system for motor speed control, as by electronically comparing the actual motor speed with that which is desired, to produce an error correction signal which is utilized to vary the data input rate and/or the motor speed.

Referring again to FIG. 1, the light source 38 is connected to a suitable power supply (not shown) to illuminate the sensor 40 as the motor 18 is energized (the brake means having been disengaged upon application of power to the motor 18). That is, the light from source 38 is transmitted to the sensor 40 through the mask 36 when an opening in the optical disc 34 passes over an opening in the mask 36, such that the light source detected by the sensor 40 alternately makes and breaks, thereby providing a pulsing electrical signal as the output of the sensor 40. Ideally, of course, the signal is of a constant frequency, but in any event the signals, presented to the drive control 21 are compared by this circuitry to the reference signal provided from reference source 22 and supplied through line 76. The signal thus generated by the drive control 21 is a compensated one which will hold the speed of motor 18 at the desired constant valve. In and of themselves, and without the optical-mechanical clock system of the invention, closed loop speed control servo systems are well-known to those skilled in the art, and therefore it is not believed necessary to describe the drive control means 21 in any greater detail.

The data information to be placed on the tape is transmitted from the data terminal or like source 24 to the data input tape head 28 through lines 80 and 82. A data gate means 26 is positioned between the data source 24 and the head 28, and is conditioned to allow the passage of digital data signals at predetermined spaced intervals by an enabling input through line 78 from the sensor 40.

It may therefore be seen that the speed of the motor 18 is directly controlled as a function of the output of the sensor 40, through the closed loop 20, while at the same time the gate 26 is also controlled by signals from the sensor 40 and therefore, tape speed and data insertion rates will be fully synchronized. When the motor is operating at the correct speed as determined by comparison of the clock signal with the reference input 22 and established by the closed loop servo system 20,800 separate pulses of the light source will be detected by the sensor 40 during each one inch of tape travel. These pulses will be provided as an electrical switching signal to the gate 26 thereby allowing the transmission of data from the data source to the tape head where they will be placed on the tape at a spacing of 800 bits per inch. In accordance with the foregoing, it may be observed that so long as the motor speed is directly controlled as a function of the clock signals fromm the optical shutter and light sensor, the repetition rate of which is precisely the same as the desired data insertion rate, the link provided by line 78 and the logic represented by gate 26 become redundant, and thus necessary, if the data source 24 is internally or otherwise carefully controlled to produce data at the same precise insertion rate as that at which the optical-mechanical clock is operated. Consequently, with an internally-clocked data source of this nature, the latter need not be connected at all to the clock, since synchronization will then be automatic so long as the clock operates at the correct rate and by motor is driven as a function of the clock rate.

It will readily be appreciated by those skilled in the art that the present invention provides a new and novel synchronizing mechanism for data handling devices which is relatively simple in construction and extremely accurate. It will similarly be realized by those so skilled that many modifications may be made. For example the invention is equally applicable to data storage apparatus which stores digital signals on a rotating magnetic recording drum driven by an electric motor. Accordingly, all such modifications are to be considered as included within the following claims unless these claims, by their language, expressly state otherwise.

The embodiments of the invention in which an exclusive property or privilege is claimed are defined as follows:

1. A source data entry terminal having a moving data recording medium; means for regulating the instantaneous speed of movement of said medium; means for controlling the rate of insertion of digitized data recorded serially on said medium in a continuing stream; and means for driving said medium with sustained smoothly continuous motion at a rate dictated by said speed-regulating means and over periods sufficiently long to record a plurality of sequential bits of said data; said recording medium speed-regulating means comprising signal-generating means operatively associated with said drive means, said signal-generating means providing an electrical signal having a parameter which is proportional to the actual rate of movement of said medium and to the data insertion rate of said data-insertion controlling means; said recording medium speed-regulating means further comprising a closed-loop servo system, said servo system including means interconnecting said driving means and said signal-generating means, to maintain said smoothly continuous driving means speed at a predetermined constant rate; circuit means including a data insertion device for recording said data on said medium; gate means in said circuit for controlling the spacing of said digitized data to said insertion device, said gate means coupled to receive and being operable by signals corresponding to said electrical signal from said signal generating means to effect the spaced insertion of said data on said medium at a particular rate proportional to said actual rate of movement of said recording medium.

2. A data entry terminal as defined in claim 1 wherein said signal generating means comprises: a light source; a light detector, said detector providing said proportional electrical signal in response to intermittent detection of said light source; and shutter means positioned between said source and said detector, said shutter movable with said driving means to periodically interrupt said light source.

3. A data entry terminal as defined in claim 2 wherein said electrical signal from said detector is connected to said servo system and to said gate means.

4. An apparatus as defined in claim 2 wherein said drive means is a variable-speed motor having a shaft extending from the ends thereof, one end of said shaft being adapted to drive said recording medium, the other end of said shaft having said shutter means mounted thereon, whereby rotation of said shaft causes correlated simultaneous movement of said recording medium and said shutter to interrupt said light source to thereby provide a pulsating electrical output from said sensor having a direct relationship to the movement of said recording medium.

5. An apparatus as defined in claim 4 wherein said shutter comprises a disk-like member having a plurality of equally spaced openings therein and a mask having at least one corresponding opening therein positioned between said shutter and said detector, whereby a beam of light from said source periodically passes through said openings in said shutter and said opening in said mask as said shutter is moved by said drive means to thereby produce a pulsating electrical signal from said sensor.

6. Data processing equipment having a magnetic tape recording medium, means for regulating the linear travel speed of said tape, means for controlling the rate of insertion of digitized data recorded in continuous serial streams onto said tape, and means for driving said tape along a data recording head at a regulated speed determined by said speed-regulating means, wherein the latter means comprises a light source and a light detector, said detector adapted to provide an electrical pulse output upon detecting interrupted transmissions of a light beam from said source; a light beam interrupter positioned between said source and said detector, said interrupter including a portion connected to and rotatable with said driving means to interrupt said light source; a closed-loop servo system including said source, said interrupter and said detector, said detector providing an electrical output signal in said servo system representative of the actual linear speed of said tape during said sustained continuous motion; and said means for controlling the rate of data insertion on said tape including data-gating means controlled by the output signal from said sensor detector and effective to control the rate of insertion of discrete bits of said digitized data in said continuous serial streams thereof.

7. A method of implementing a digital data clock, comprising the steps; using a common driving means to impart motion to both a data recorder means and to a drive-responsive clock signal generator; using said clock signals by comparing them to a reference standard in a servo-type speed-controlling system to accurately and closely maintain said motion of said data recorder means for a given sustained period and at a predetermined particular constant speed at which said clock signals from said clock signal generator have a frequency corresponding to a previously set data insertion frequency; and recording a series of data bits by use of said recorder means at said data insertion frequency during said sustained period of motion.

8. The method of claim 7, wherein said step of recording data at said data insertion frequency is done by use of data spacing and regulating means separate and independent from said clock signal generator but having the same operating repetition rate.

* * * * *